(12) United States Patent
Pandey et al.

(10) Patent No.: US 12,519,730 B2
(45) Date of Patent: Jan. 6, 2026

(54) DYNAMIC MEMORY BANDWIDTH SHAPING

(71) Applicant: NVIDIA Corp., Santa Clara, CA (US)

(72) Inventors: Ashutosh Pandey, Bengaluru (IN); Jay Kishora Gupta, Bangalore (IN); Anurag Chaudhary, San Jose, CA (US); Steven E Molnar, Chapel Hill, NC (US); John Kelley, Fort Collins, CO (US)

(73) Assignee: NVIDIA Corp., Santa Clara, CA (US)

( * ) Notice: Subject to any disclaimer, the term of this patent is extended or adjusted under 35 U.S.C. 154(b) by 0 days.

(21) Appl. No.: 18/668,765

(22) Filed: May 20, 2024

(65) Prior Publication Data

US 2025/0358228 A1 Nov. 20, 2025

(51) Int. Cl.
*H04L 47/22* (2022.01)
*H04L 47/10* (2022.01)
*H04L 47/52* (2022.01)

(52) U.S. Cl.
CPC ............. *H04L 47/22* (2013.01); *H04L 47/39* (2013.01); *H04L 47/521* (2013.01)

(58) Field of Classification Search
CPC ................................ H04L 47/22; H04L 47/39
See application file for complete search history.

(56) References Cited

U.S. PATENT DOCUMENTS

| | | | | |
|---|---|---|---|---|
| 7,310,348 B2* | 12/2007 | Trinh | ....... | H04L 47/50 370/428 |
| 8,195,858 B1* | 6/2012 | Keil | ....... | G06F 12/0859 710/117 |
| 8,826,270 B1* | 9/2014 | Lewis | ....... | G06F 9/5016 718/1 |
| 10,382,582 B1* | 8/2019 | Frink | ....... | H04L 49/9063 |
| 2001/0049711 A1* | 12/2001 | Nishihara | ....... | H04L 47/22 718/100 |
| 2003/0112817 A1* | 6/2003 | Woo | ....... | H04L 47/20 370/413 |
| 2003/0154328 A1* | 8/2003 | Henderson | ....... | H04L 47/32 710/1 |
| 2003/0229714 A1* | 12/2003 | Kiremidjian | ....... | H04L 49/90 709/244 |
| 2011/0010427 A1* | 1/2011 | Jnagal | ....... | G06F 3/067 709/213 |
| 2012/0020223 A1* | 1/2012 | Sonnier | ....... | H04L 49/254 370/235.1 |
| 2012/0023295 A1* | 1/2012 | Nemawarkar | ....... | H04L 49/101 711/130 |
| 2012/0106325 A1* | 5/2012 | Janakiraman | ....... | H04L 47/15 370/230 |
| 2015/0007189 A1* | 1/2015 | De Gruijl | ....... | H04L 41/0896 718/104 |
| 2016/0044695 A1* | 2/2016 | Gunner | ....... | H04L 49/90 370/336 |
| 2017/0206107 A1* | 7/2017 | Guha | ....... | G06F 3/0647 |
| 2019/0140962 A1* | 5/2019 | Thottethodi | ....... | H04L 47/283 |

(Continued)

*Primary Examiner* — Hieu T Hoang
(74) *Attorney, Agent, or Firm* — Carnelian Law, LLC (57) ABSTRACT

Bandwidth shaping mechanisms in a memory hierarchy operate a first bandwidth shaper on a first memory, such as a cache memory, to shape bandwidth to a second memory, such as a Dynamic Random Access Memory, and replenish the first bandwidth shaper from a second bandwidth shaper based on a hit bandwidth on the first memory.

20 Claims, 4 Drawing Sheets

(56) References Cited

U.S. PATENT DOCUMENTS

2020/0007454 A1\* 1/2020 Frink ...................... H04L 47/83
2020/0412655 A1\* 12/2020 Thyagaturu ......... H04L 63/0254
2022/0385582 A1\* 12/2022 Detwiler ............. H04L 43/0894

\* cited by examiner

DYNAMIC MEMORY BANDWIDTH SHAPING

BACKGROUND

Bandwidth shaping, also known as traffic shaping, refers to the process of managing bandwidth usage in order to prioritize certain types of traffic. Bandwidth shaping adjusts the transmission rates of different traffic types and may implement policies to ensure that critical traffic receive sufficient bandwidth while non-essential traffic is limited in congested circumstances. Performance, quality of service, and resource allocation may be improved with bandwidth shaping techniques.

In devices utilizing hierarchical memory systems, a memory interface at a higher level (closer to the data processor, e.g., a cache memory) may be subjected to bandwidth demands that are much higher (due to hits) compared to the bandwidth demands on the interface to a lower memory level (e.g., the main system memory, DRAM). Traffic classes generating hits on the upper memory and not making significant demands on the lower memory should not have their bandwidth allocation penalized by traffic classes utilizing the interface to lower memory more heavily.

The traffic classes that are subscribing the lower memory bandwidth to a lesser degree (e.g., due to consistently hitting a cache memory) should not penalize the bandwidth share allocated to other traffic classes.

Conventional mechanisms may lack the ability to flexibility shape traffic bandwidth based on traffic patterns to multiple levels of a memory hierarchy.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Different traffic classes with different bandwidth requirements and cache hit/cache miss traffic patterns may all request bandwidth from a memory, such as a cache memory. At a given moment or interval during operation, the available bandwidth of the memory may be insufficient to service all of the pending requests. A bandwidth arbiter for the cache memory may determine which requests to grant at a given point in time based on many factors. The bandwidth request traffic from the different traffic classes may be shaped at the input to the bandwidth arbiter by a plurality of bandwidth shapers (e.g., flow control logic).

Disclosed herein are embodiments of systems in which a bandwidth arbiter mechanism is configured with a plurality of bandwidth shapers (DDAs) to distinguish between bandwidth requests fulfilled directly from a first level of a memory hierarchy (e.g., a cache memory) and requests that are ultimately fulfilled from a lower level of the memory hierarchy (e.g., from a system memory device such as a Dynamic Access Random Memory (DRAM) due to a cache miss).

In one embodiment, the bandwidth arbiter may distinguish between a bandwidth grant that resulted in no system memory access (e.g., a READ hit on a cache memory, or a memory allocation request) and a bandwidth grant that resulted in a system memory access (e.g., a cache READ miss, WRITE-through, or WRITE-back). Bandwidth grants resulting in no system memory access do not add to the load on system memory bandwidth. Therefore in response to such grants the input bandwidth arbiter may not penalize the system memory bandwidth available to the traffic class that received the grant.

The disclosed embodiments may utilize bandwidth shaping mechanisms to the input bandwidth arbiter of a memory. One of these mechanisms is referred to herein as the primary bandwidth shaper. The primary bandwidth shaper tracks grants for requests for bandwidth, and operates based on the memory bandwidth allocation and traffic between two components (e.g., between two devices in a memory hierarchy).

The second traffic shaping mechanism is referred to herein as the secondary bandwidth shaper. The secondary bandwidth shaper tracks the hit bandwidth on the memory and determines to what extent traffic classes have subscribed their hit bandwidth allocation on the memory, and replenishes the allocations in the primary bandwidth shaper accordingly. A replenishment is a setting indicating that a traffic class has earned additional bandwidth grants.

The bandwidth shapers cooperate to control admission of requests to the input bandwidth arbiter of a memory that may result in oversubscription of downstream resources if granted, based on historic subscription of those downstream resources by particular traffic classes.

For example, the primary bandwidth shaper may track the bandwidth traffic on a main system memory and generate a mask that is utilized by the input bandwidth arbiter for a cache memory. An accumulator of the primary bandwidth shaper associated with a particular traffic class may be incremented at a fixed rate at each bandwidth period (e.g., each memory cycle or clock) and at any time the secondary bandwidth shaper applies a replenishment to the primary bandwidth shaper. If a bandwidth request to the cache memory results in no traffic to the main system memory, and the requesting traffic class has not fully subscribed its cache memory hit bandwidth share, then the primary bandwidth shaper may receive a replenishment from the secondary bandwidth shaper for that traffic class. The primary bandwidth shaper maintains an accumulator for the requesting traffic class that is decremented by a configured amount in response to a grant of bandwidth to the cache memory.

The secondary bandwidth shaper tracks the memory hit bandwidth consumed per traffic class. An accumulator of the secondary bandwidth shaper associated with a particular traffic class may be incremented at a fixed rate at each bandwidth period (e.g., each memory cycle or clock). Typically the accumulator refresh rate of the primary band width shaper and the accumulator refresh rate of the secondary bandwidth shaper will vary.

The secondary bandwidth shaper may track whether or not a particular traffic class is fully subscribing its allocated cache memory hit bandwidth (accumulator value is zero or negative, for example). If a traffic class has not fully subscribed its allocated cache memory hit bandwidth, it may be enabled to receive replenishments for cache misses. However, if a traffic class has fully subscribed its allocated cache memory hit bandwidth, cache miss replenishments for that traffic class may be suppressed for a period of time. (The traffic class may continue to accumulate credit for cache miss bandwidth due to the periodic increments to its associated accumulator in the primary bandwidth shaper each memory cycle, up to a configured cap/limit).

In one embodiment, the primary bandwidth shaper and the secondary bandwidth shaper may each generate mask bits or other settings that are combined and applied by a bandwidth arbiter to shape bandwidth request traffic to a memory device, for example to a cache memory. In other embodiments only the primary bandwidth shaper generates mask settings.

The primary bandwidth shaper and the secondary bandwidth shaper operate cooperatively to monitor bandwidth demands on the two memories of the memory hierarchy and help ensure that bandwidth requestors that hit the upper memory of the memory hierarchy and do not subscribe bandwidth to the lower memory of the memory hierarchy are not penalized. At the same time, the bandwidth requestors that are not subscribing bandwidth on the lower memory and consistently hitting in upper memory are prevented from taking bandwidth share from requestors that are subscribing bandwidth to the lower memory. The bandwidth shapers cooperate to generate settings (e.g., a request traffic mask) that configure an input bandwidth arbiter of the upper memory (e.g., the cache memory).

In one embodiment, the primary bandwidth shaper comprises an accumulator (for each traffic class) that is incremented according to a first rate setting each cycle time (e.g., clock period or half period) of the upper memory, and that is incremented by a set amount each time the secondary bandwidth shaper generates a replenish indication to the primary bandwidth shaper. The accumulator of the primary bandwidth shaper may also be decremented by a set amount in response to every bandwidth grant to the corresponding traffic class made by the input bandwidth arbiter that generates traffic to the lower memory of the memory hierarchy.

In one embodiment, the secondary bandwidth shaper also increments accumulators for different traffic classes at a rate based on a cycle time of the upper memory. The increment rate for these accumulators may be a different rate than that at which the accumulators in the secondary bandwidth shaper are incremented. These accumulators are decremented in response to hits on the upper memory by the traffic classes. Additionally, in response to hits on the upper memory, and if (on condition) that an accumulator has not reached a value indicating full subscription of hit bandwidth on the upper memory by the traffic class, the secondary bandwidth shaper generates a replenishment signal for the traffic class to the primary bandwidth shaper.

In one embodiment, if a request is for a memory allocation that results in an eviction from the upper memory of the memory hierarchy, both of the primary bandwidth shaper and the secondary bandwidth shaper may decrement their respective accumulator for the traffic class of the request by a configured amount. If the request also generates bandwidth to the lower memory, no replenishment is generated.

Figure 1:
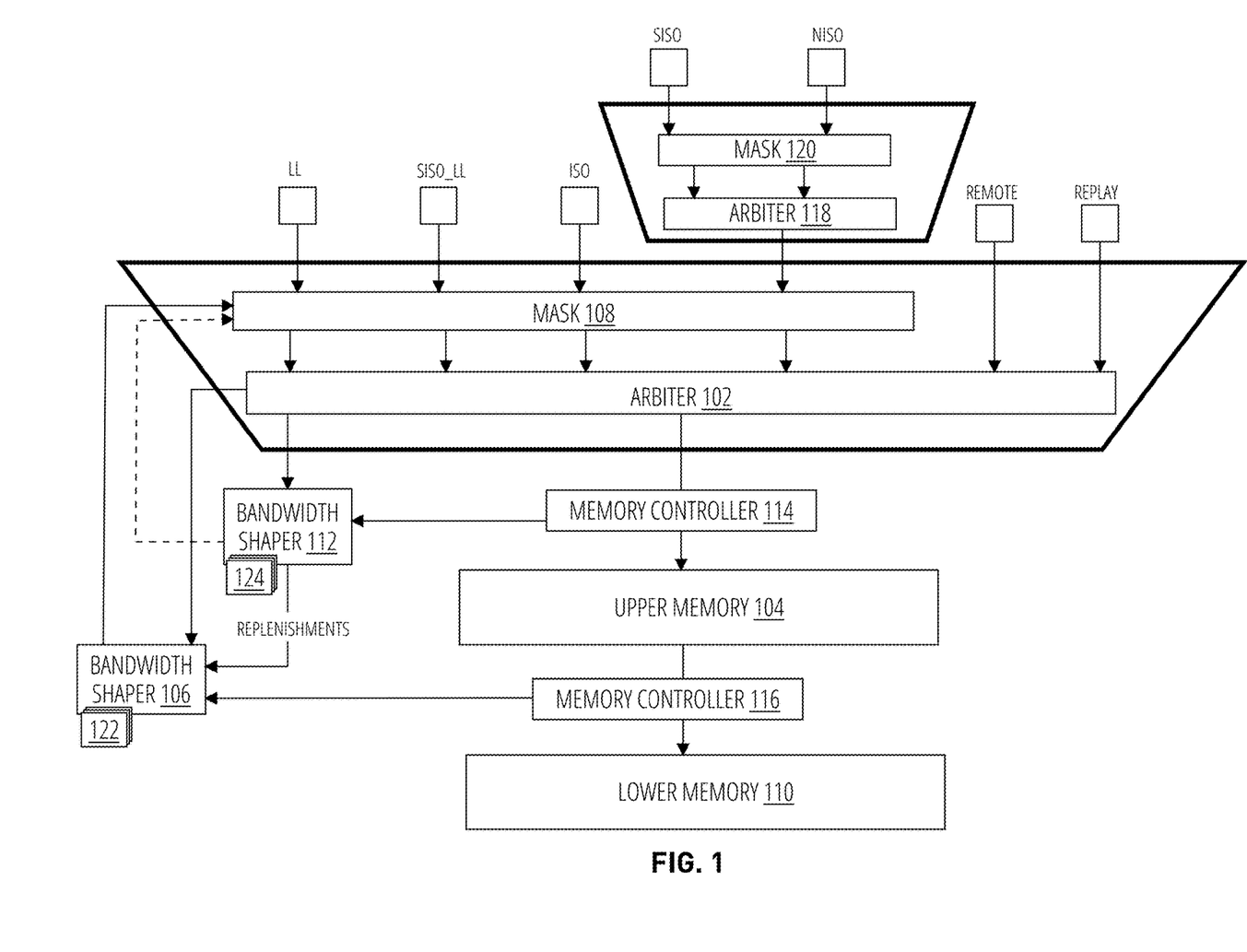
FIG. 1 depicts an embodiment of a memory hierarchy in one embodiment.
Figure 2:
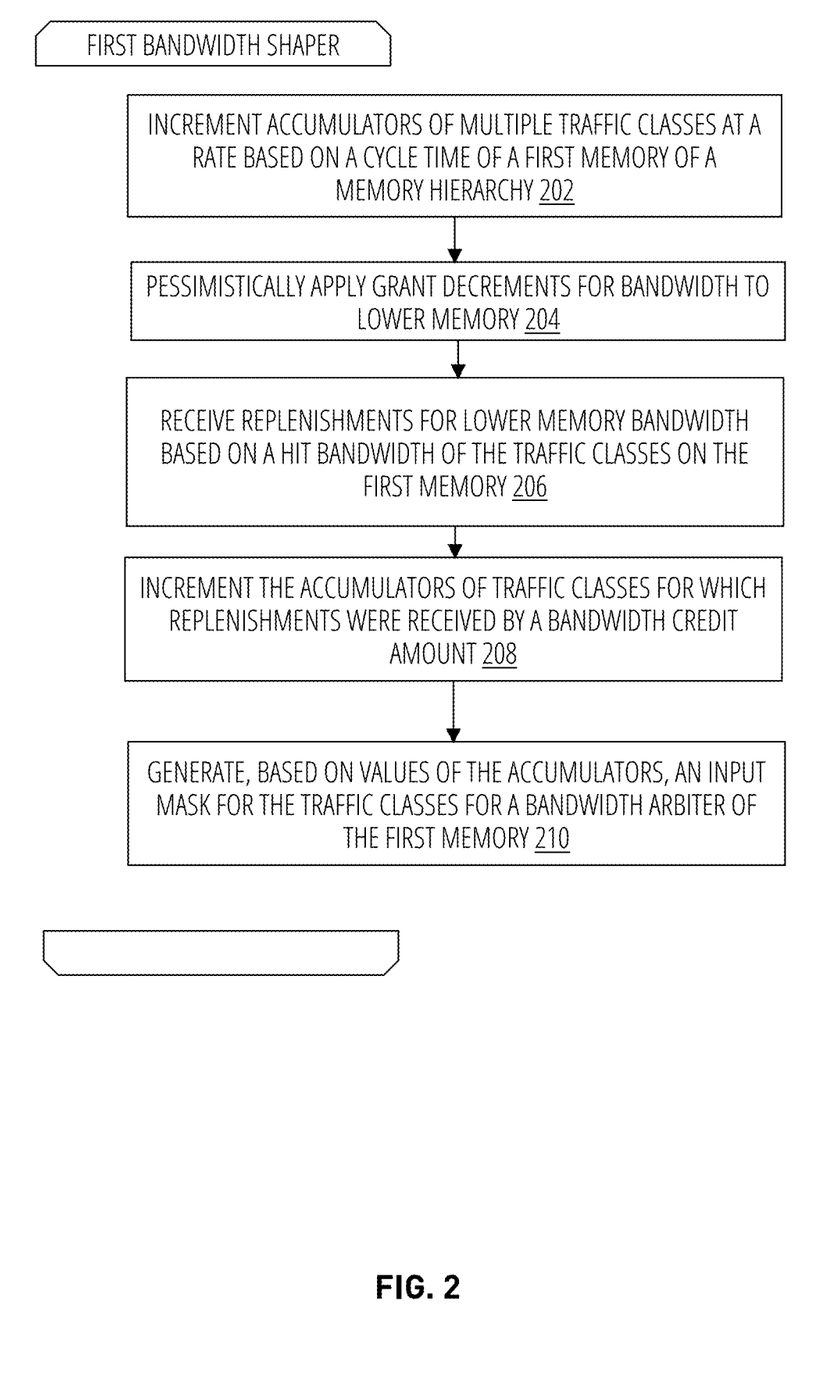
FIG. 2 depicts a bandwidth shaping process in accordance with one embodiment.
Figure 3:
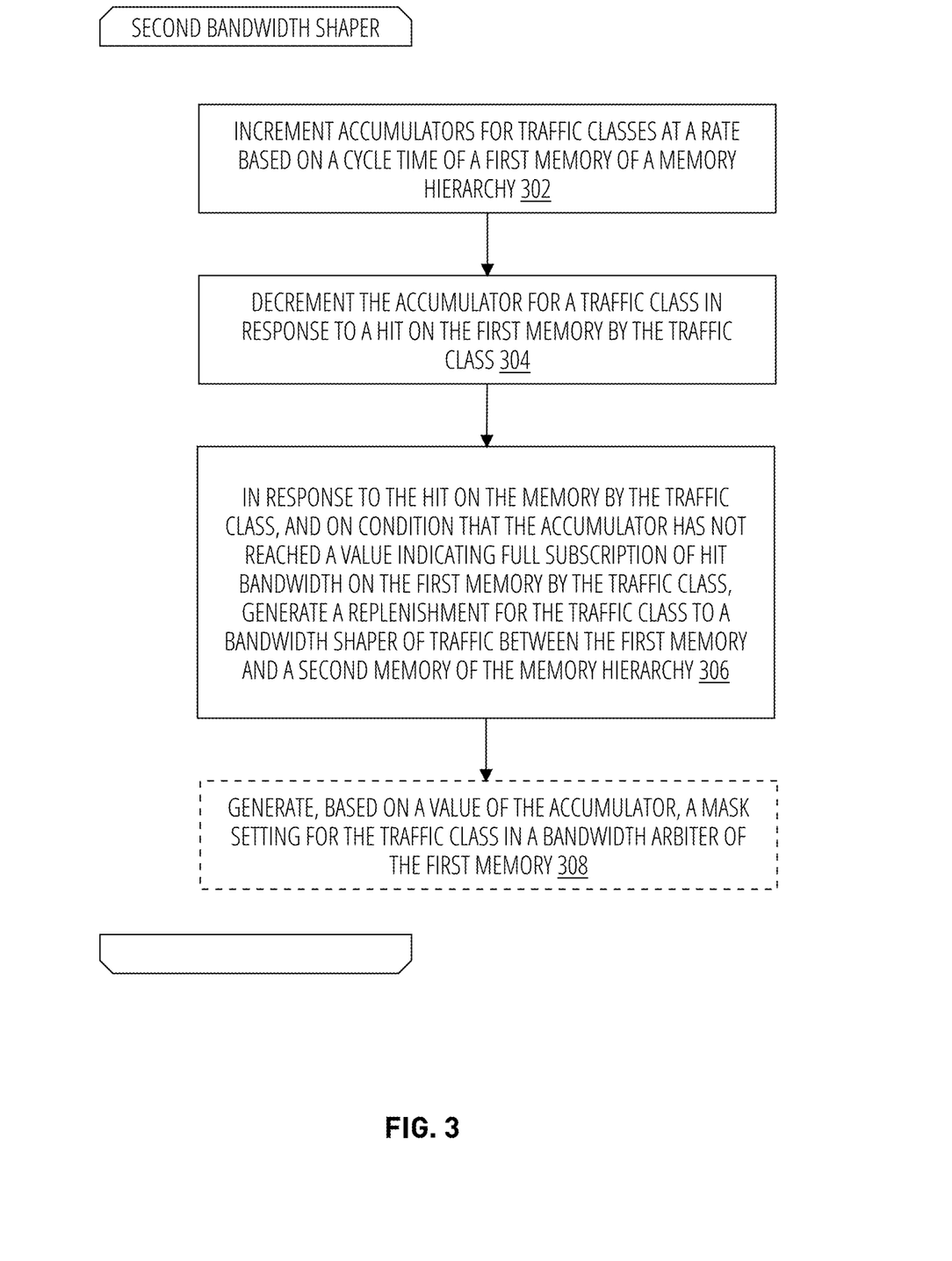
FIG. 3 depicts a bandwidth shaping process in accordance with another embodiment.

FIG. 1 depicts an embodiment of a memory hierarchy in one embodiment. FIG. 2 and FIG. 3 depict embodiments of bandwidth shaping processes that may be utilized in this memory hierarchy.

Various traffic classes with different latency and quality of service requirements submit requests to an arbiter 102 of an upper memory 104 (e.g., cache memory). A primary bandwidth shaper 106 formulates settings for an input request mask 108 for the arbiter 102. The primary bandwidth shaper 106 formulates mask settings for the different traffic classes based on their utilization of bandwidth to the lower memory 110 (e.g., DRAM/system memory). In some embodiments, the secondary bandwidth shaper 112 may also formulate mask settings for the arbiter 102.

The primary bandwidth shaper 106 and the secondary bandwidth shaper 112 may interact with a memory controller 114 for the upper memory 104 and a memory controller 116 for the lower memory 110 to track hit bandwidth on the upper memory 104 and bandwidth to the lower memory 110, respectively.

In the depicted embodiment, multiple levels of arbitration are applied to the requests for bandwidth from the traffic classes. An arbiter 118 with an input request mask 120 is utilized to arbitrate between SISO and NISO type traffic classes and grants from the arbiter 118 are further arbitrated with requests from other classes by the arbiter 102. Some traffic classes may not be subject to masking (e.g., REMOTE and REPLAY requests). A description of the various traffic classes depicted in FIG. 1 is provided below.

The primary bandwidth shaper 106 may accumulate (accumulators 122) bandwidth grant credits for the lower memory 110 periodically (e.g., per the memory bus clock) on a per-traffic class basis (see block 202). The secondary bandwidth shaper 112 may also accumulate (accumulators 124) bandwidth grant credits to the upper memory 104 periodically on a per-traffic class basis and may decrement the accumulators 124 in response to hits on the upper memory 104 (see block 302 and block 304).

In response to the arbiter 102 granting a bandwidth request to the upper memory 104, a pessimistic assumption may be applied in the primary bandwidth shaper 106 that the request generates traffic to the lower memory 110 (block 204). The primary bandwidth shaper 106 may apply grant decrements for the traffic class making the request from the corresponding one of the accumulators 122. It may subsequently be determined that the grant generated no bandwidth to the lower memory 110 (e.g., due to a READ hit on the upper memory 104, tracked by the secondary bandwidth shaper 112). Upon this condition, and further on condition that the traffic class has not violated its configured hit bandwidth limit, the secondary bandwidth shaper 112 may generate a replenishment for the traffic class for bandwidth to the lower memory 110 (block 306). The replenishment may be communicated from the secondary bandwidth shaper 112 to the primary bandwidth shaper 106 (block 206), which applies an associated bandwidth increment back to the traffic (block 208).

A traffic class that hits the upper memory 104 consistently may cause the arbiter 102 for the upper memory 104 to block or slow down lower memory bandwidth for other traffic classes when those traffic classes begin to miss the upper memory 104 and thereby generate traffic to the lower memory 110. To mitigate this circumstance, replenishments for bandwidth to the lower memory 110 are provided to the primary bandwidth shaper 106 under the control of the secondary bandwidth shaper 112 on condition that traffic classes are not violating a configured hit bandwidth on the upper memory 104.

The secondary bandwidth shaper 112 essentially caps the lower memory 110 bandwidth replenishment of traffic classes that are hitting the upper memory 104, e.g., cache, at a high frequency.

The settings in the mask 108 are generated based on values of the accumulators 122 (and also potentially accumulators 124) and determine whether or not a request for bandwidth from a traffic class is eligible to be an input to the arbiter 102 during a given cycle. In one embodiment the primary bandwidth shaper 106 is responsible for generating or clearing mask settings (block 210). In another embodiment the secondary bandwidth shaper 112 may also contribute settings to the mask 108 (block 308).

If the accumulator value of a particular one of the traffic classes for a particular type of bandwidth is, for example, greater than zero, the associated mask setting may be clear, indicating that the arbiter 102 may receive more requests for that type of bandwidth for that traffic class. If an accumulator value for a particular traffic class and bandwidth type falls for example below zero, the associated mask bit may be set, temporarily stopping those requests from consideration by the arbiter 102, or causing the arbiter 102 to de-prioritize those requests.

Applying the mask to prioritize and deprioritize a traffic class inputs, rather than blocking masked inputs entirely from consideration for bandwidth, may in some cases improve bandwidth utilization in the memory hierarchy. For example, prioritized traffic may be granted available bandwidth, but deprioritized traffic may only be granted available bandwidth if no prioritized traffic is also contending for the available bandwidth.

The primary bandwidth shaper 106 (or the arbiter 102) may pessimistically assume that requests will subscribe bandwidth to the lower memory 110 and apply a grant decrement to the accumulator for the traffic class making the request (block 202), regardless of whether the requests eventually results in traffic to the lower memory 110. If the outcome of the request, once granted, does not lead to lower memory traffic (e.g., results in a hit on the upper memory 104), the secondary bandwidth shaper 112 may signal the primary bandwidth shaper 106 with a replenishment to increment the associated accumulator by a bandwidth increment amount (e.g., equal to the grant decrement amount for the traffic class, although not necessarily so). The replenishment is not provided by the secondary bandwidth shaper 112 if the traffic class has oversubscribed its allocated hit bandwidth on the upper memory 104.

In one embodiment, each bandwidth shaper maintain a separate accumulator for each 'input stream'. Input streams are the traffic classes shown entering the arbiter 102 (ISO, SISO, etc.). One stream merges the requests from (potentially) multiple requestors (clients) that are utilizing a particular traffic class.

When a request is granted by the arbiter 102, the grant decrement may be applied to: (1) the (traffic class-specific) accumulator of the primary bandwidth shaper 106 that tracks bandwidth to the lower memory 110, and (2) the (traffic class-specific) accumulator of the secondary bandwidth shaper 112 that tracks hits on the upper memory 104.

Signals from the memory controller 116 may indicate that a grant resulted in traffic to the lower memory 110. If the traffic class is high-priority to receive bandwidth to the upper memory 104, it may have no configured cap on hit bandwidth. For such a traffic class, if the grant resulted in traffic to the lower memory 110, a replenishment for lower memory traffic may always be applied from the secondary bandwidth shaper 112 to the primary bandwidth shaper 106 for the traffic class.

If however the traffic class is not high-priority to receive bandwidth to the upper memory 104, a hit bandwidth cap may be configured for the traffic class. In this case, if the grant resulted in traffic to the lower memory 110, a replenishment may be provided from the secondary bandwidth shaper 112 to the primary bandwidth shaper 106 for the traffic class only if the hit bandwidth cap for the traffic class has not been violated (e.g., reached or exceeded).

Exemplary traffic classes that may request bandwidth in system depicted in FIG. 1 include Isochronous (ISO), Soft Isochronous (SISO), Low-latency SISO (SISO_LL), Non-Isochronous (NISO), and Low latency (LL).

ISO traffic class clients have fixed latency requirements and a specified bandwidth. Bandwidth disruptions may be provisioned for by appropriate buffering. Examples of ISO traffic class clients include visual display and cameras.

SISO traffic class clients have fixed bandwidth requirements within a longer time horizon than ISO clients. Stalls are acceptable within this time horizon so long as the specified bandwidth is provided for a specified minimum fraction of each period. SISO requests require bounded latency.

SISO_LL traffic class clients have similar requirements as SISO, but with low latency being more critical to meet the clients' performance requirements.

NISO traffic class clients generate bulk traffic with best-effort service for both bandwidth and latency. Faster is better, but there are no hard deadlines or guarantees with this traffic class.

For LL traffic class clients, meeting performance constraints depends on achieving the lowest possible latency. Low latency is ensured up to a certain bandwidth, beyond which the traffic class characteristics become like NISO. Central processing unit (CPU) requests are an example that may utilize the LL traffic class.

In the depicted example, a hierarchical arbiter is implemented for traffic class arbitration at the upper memory 104 input. In the first stage comprising arbiter 118 and mask 120, SISO traffic is arbitrated with NISO traffic, and in the second stage comprising arbiter 102 and mask 108, the winner of the first stage is arbitrated with ISO, SISO_LL and CPU_LL traffic.

The depicted system enables the support of request traffic across a wide range of different latency requirements. The systems may enable this range by calculating a deadline for each received request and then prioritizing requests that reach their deadline and still have not been serviced. The deadline-based prioritization may take place in the memory controller 114. When all requests are within their deadline, the arbiter 102 may grant requests on the basis of maximizing throughput efficiency. If any requests have exceeded their deadline, the arbiter 102 may operate in a mode that assigns higher priority to the expired request(s).

Figure 4:
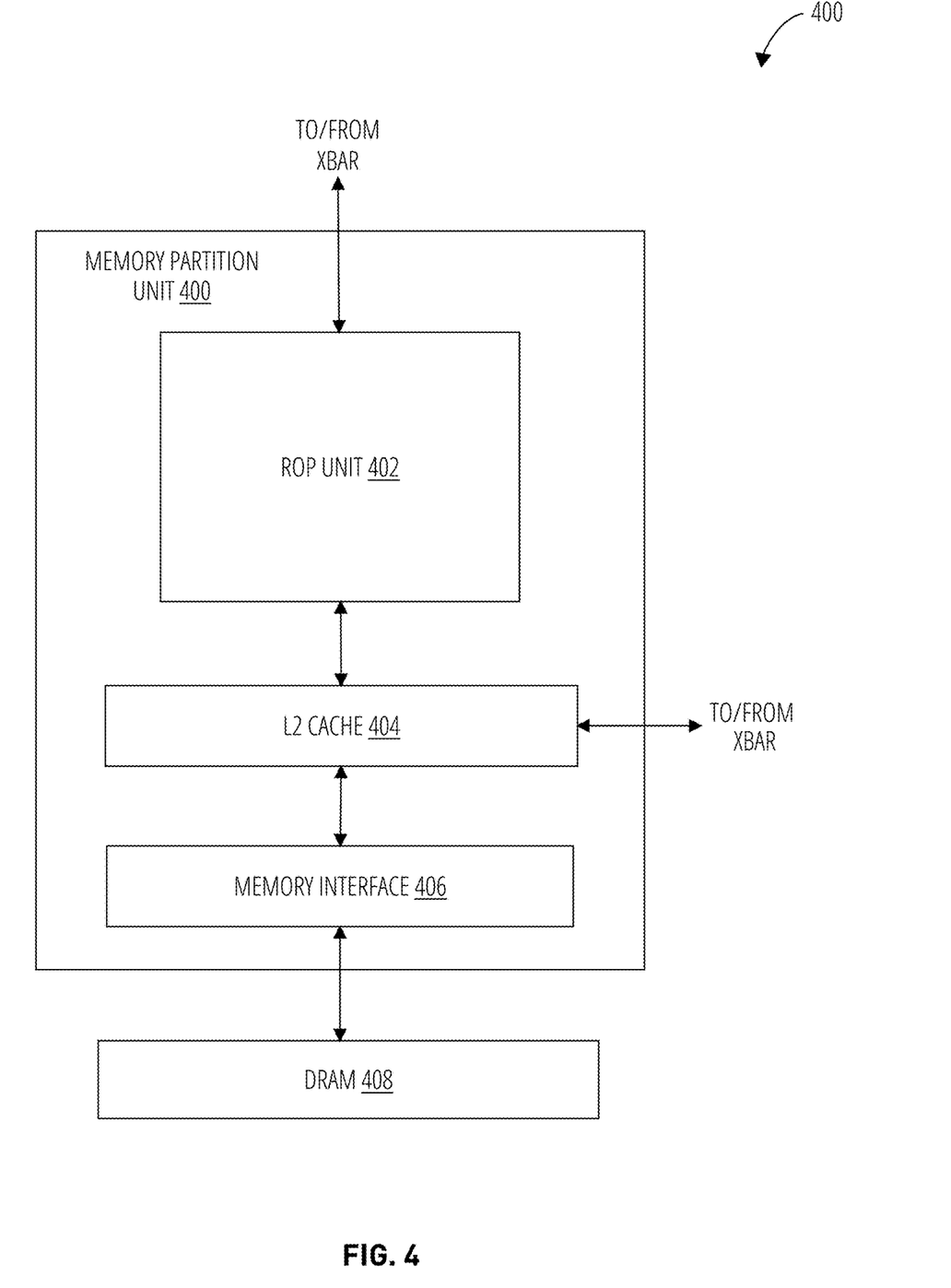
FIG. 4 depicts a memory partition unit 400 in accordance with one embodiment.

FIG. 4 depicts a memory partition unit 400 of a parallel processing unit in accordance with an embodiment. Embodiments of the mechanisms disclosed herein may be utilized for example to shape bandwidth between the level two cache 404 and the DRAM 408, and/or between the level two cache 404 and a level one cache.

The parallel processing unit may be utilized in a high-performance parallel processor such as a graphics processing unit. As shown in FIG. 4, the memory partition unit 400 includes a raster operations unit 402, a level two cache 404, and a memory interface 406. The memory interface 406 is coupled to a DRAM 408. Memory interface 406 may implement 32, 64, 128, 1024-bit data buses, or the like, for high-speed data transfer. In an embodiment, the parallel processing unit incorporates a number U of memory interface 406 modules, one memory interface 406 per pair of memory partition unit 400 modules, where each pair of memory partition unit 400 modules is connected to a corresponding DRAM 408 device. For example, a parallel processing unit may be coupled to up to Y DRAM 408 devices, such as high bandwidth memory stacks or graphics double-data-rate, version 5, synchronous dynamic random access memory, or other types of persistent storage.

In an embodiment, the memory interface 406 implements an HBM2 memory interface and Y equals half U. In an embodiment, the HBM2 memory stacks are located on the same physical package as the parallel processing unit, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the DRAM 408 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit modules process very large datasets and/or run applications for extended periods.

In an embodiment, the parallel processing unit implements a multi-level memory hierarchy. In an embodiment, the memory partition unit 400 supports a unified memory to provide a single unified virtual address space for CPU and parallel processing unit memory, enabling data sharing between virtual memory systems. In an embodiment the frequency of accesses by a parallel processing unit to memory located on other processors is traced to ensure that memory pages are moved to the physical memory of the parallel processing unit that is accessing the pages more frequently.

In an embodiment, copy engines transfer data between multiple parallel processing unit modules or between parallel processing unit modules and CPUs. The copy engines can generate page faults for addresses that are not mapped into the page tables. The memory partition unit 400 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the DRAM 408 or other system memory may be fetched by the memory partition unit 400 and stored in the level two cache 404, which is located on-chip and is shared between various general processing cluster modules. As shown, each memory partition unit 400 includes a portion of the level two cache 404 associated with a corresponding DRAM 408 device. Lower level caches may then be implemented in various units within the general processing cluster modules. For example, each of a number of streaming multiprocessor modules may implement an L1 cache. The L1 cache is private memory that is dedicated to a particular streaming multiprocessor. Data from the level two cache 404 may be fetched and stored in each of the L1 caches for processing in the functional units of the streaming multiprocessor modules. The level two cache 404 may be coupled to the memory interface 406 and to a crossbar switch (XBAR).

The raster operations unit 402 performs graphics raster operations related to pixel color, such as color compression, pixel blending, and the like. The raster operations unit 402 also implements depth testing in conjunction with a raster engine, receiving a depth for a sample location associated with a pixel fragment from the culling engine of the raster engine. The depth is tested against a corresponding depth in a depth buffer for a sample location associated with the fragment. If the fragment passes the depth test for the sample location, then the raster operations unit 402 updates the depth buffer and transmits a result of the depth test to the raster engine. It will be appreciated that the number of partition memory partition unit 400 modules may be different than the number of general processing cluster modules and, therefore, each raster operations unit 402 may be coupled to each of the general processing cluster modules. The raster operations unit 402 tracks packets received from the different general processing cluster modules and determines which general processing cluster that a result generated by the raster operations unit 402 is routed to through the crossbar. Although the raster operations unit 402 is included within the memory partition unit 400 in FIG. 4, in other embodiment, the raster operations unit 402 may be outside of the memory partition unit 400. For example, the raster operations unit 402 may reside in the general processing cluster or another unit.

LISTING OF DRAWING ELEMENTS 102 arbiter
104 upper memory
106 primary bandwidth shaper
108 mask
110 lower memory
112 secondary bandwidth shaper
114 memory controller
116 memory controller
118 arbiter
120 mask
122 accumulators
124 accumulator
202 block
204 block
206 block
208 block
210 block
302 block
304 block
306 block
308 block
400 memory partition unit
402 raster operations unit
404 level two cache
406 memory interface
408 DRAM Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Logic symbols in the drawings should be understood to have their ordinary interpretation in the art in terms of functionality and various structures that may be utilized for their implementation, unless otherwise indicated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the intended invention as claimed. The scope of inventive subject matter is not limited to the depicted embodiments but is rather set forth in the following Claims.

What is claimed is:

1. A process comprising:
   operating a first bandwidth shaper on a first memory to shape bandwidth to a second memory; and
   replenishing the first bandwidth shaper from a second bandwidth shaper based on a hit bandwidth on the first memory.

2. The process of claim 1, wherein the first memory operates as a cache for the second memory.

3. The process of claim 2, wherein the second memory is a dynamic random access memory.

4. The process of claim 1, further comprising:
   associating a hit bandwidth limit with a traffic class; and
   on condition that the traffic class violates the hit bandwidth limit, operating the second bandwidth shaper to suppress replenishments to the first bandwidth shaper for bandwidth to the second memory.

5. The process of claim 1, further comprising:
   associating with a traffic class a limit on bandwidth to the second memory; and
   on condition that the traffic class violates the bandwidth limit, operating the first bandwidth shaper to suppress bandwidth requests from the traffic class to an input arbiter of the first memory.

6. The process of claim 1, further comprising:
   the second bandwidth shaper replenishing the first bandwidth shaper with bandwidth to the second memory for all requests that hit the first memory for traffic classes that do not have a configured limit of the hit bandwidth.

7. The process of claim 1, further comprising:
   accumulating credit for the bandwidth for the second memory in the first bandwidth shaper at a first rate; and accumulating credit for the hit bandwidth in the second bandwidth shaper at a second rate different than the first rate.

8. The process of claim 1, wherein the first bandwidth shaper is configured to assume that every grant of bandwidth to the first memory results in bandwidth to the second memory.

9. A memory system comprising:
a first memory and a second memory;
the first memory configured as a cache for the second memory;
a first bandwidth shaper configured to shape bandwidth for the second memory;
a second bandwidth shaper configured to track hit bandwidth on the first memory; and
the second bandwidth shaper configured to provide replenishments of bandwidth to the second memory to the first bandwidth shaper based on the hit bandwidth.

10. The memory system of claim 9, the second bandwidth shaper further configured to provide the replenishments to the first bandwidth shaper unconditionally for traffic that hits the first memory, on condition that the traffic lacks a configured hit bandwidth limit.

11. The memory system of claim 9, the second bandwidth shaper further configured to suppress the replenishments for traffic classes that have violated a configured limit on the hit bandwidth.

12. The memory system of claim 9, the first bandwidth shaper configured to mask bandwidth requests to an input bandwidth arbiter of the first memory.

13. The memory system of claim 9, the second bandwidth shaper comprising:
logic to refresh credit for the hit bandwidth for each of the traffic classes at a first rate.

14. The memory system of claim 13, the first bandwidth shaper comprising:
logic to refresh credit for the bandwidth to the second memory for each of the traffic classes at a second rate different than the first rate.

15. The memory system of claim 9, the first bandwidth shaper configured to decrement bandwidth credit for the second memory pessimistically in response to grants of bandwidth to the first memory by an arbiter.

16. A system comprising:
an upper memory of a memory hierarchy;
a lower memory of the memory hierarchy;
a bandwidth shaper comprising:
an accumulator for bandwidth credit for a traffic class to access the lower memory;
logic configured to:
increment the accumulator at a rate based on a cycle time of the upper memory;
decrement the accumulator by a set amount in response to a grant of bandwidth for the traffic class to the upper memory;
apply a lower memory bandwidth replenishment signal for the traffic class to the accumulator, the replenishment signal based on a hit bandwidth of the traffic class on the upper memory; and
generate, based on a value of the accumulator, a mask setting for the traffic class in a bandwidth arbiter of the upper memory.

17. The system of claim 16, wherein the upper memory is a cache memory of the lower memory.

18. The system of claim 17, wherein the lower memory is a system memory.

19. A system comprising:
an upper memory of a memory hierarchy;
a lower memory of the memory hierarchy;
a bandwidth shaper comprising:
an accumulator for hit bandwidth credit for a traffic class on the upper memory;
logic configured to:
increment the accumulator at a rate based on a cycle time of the upper memory;
decrement the accumulator in response to a hit on the upper memory by the traffic class; and
in response to the hit on the memory by the traffic class, and on condition that the accumulator has not reached a value indicating a violation of a configured limit on the hit bandwidth for the traffic class, generate a replenishment signal for the traffic class to a bandwidth shaper of traffic between the upper memory and the lower memory.

20. The system of claim 19, wherein the lower memory is a dynamic random access memory and the upper memory is a cache memory of the lower memory.

* * * * *